United States Patent
Roy et al.

(10) Patent No.: US 10,989,840 B2
(45) Date of Patent: Apr. 27, 2021

(54) NON-ABSORPTIVE TRANS-REFLECTIVE NANOSTRUCTURED RGB FILTERS

(71) Applicant: Applied Materials, inc., Santa Clara, CA (US)

(72) Inventors: Tapashree Roy, Bangalore (IN); Rutger Meyer Timmerman Thijssen, Sunnyvale, CA (US); Robert Jan Visser, Menlo Park, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 218 days.

(21) Appl. No.: 15/921,940

(22) Filed: Mar. 15, 2018

(65) Prior Publication Data

US 2019/0128507 A1    May 2, 2019

Related U.S. Application Data (60) Provisional application No. 62/580,000, filed on Nov. 1, 2017.

(51) Int. Cl.
*G02F 1/1335* (2006.01)
*G02B 1/00* (2006.01)

(52) U.S. Cl.
CPC ....... *G02B 1/002* (2013.01); *G02F 1/133555* (2013.01); *G02F 2203/34* (2013.01)

(58) Field of Classification Search
CPC ............ G02F 1/1333; G02F 1/133345; G02F 1/1335; G02F 1/1336; G02F 1/133555; G02F 1/13362; G02F 1/133621; G02F 1/133528; G02F 1/133514; G02F 1/133533; G02F 1/133516; G02F 2001/133622; G02F 2001/01791; G02F 2001/133521; G02F 2203/34; G02F 2203/09; G02F 2201/38; G02F 2202/36; G02B 6/0026; G02B 1/002; G02B 5/0289; B82Y 20/00
See application file for complete search history.

(56) References Cited

U.S. PATENT DOCUMENTS

| | | | |
|---|---|---|---|
| 6,031,653 | A | 2/2000 | Wang |
| 6,097,456 | A | 8/2000 | Wang |
| 6,317,264 | B1 | 11/2001 | Li et al. |

(Continued)

OTHER PUBLICATIONS

Chul-Soon Park et al.; Trans-Reflective Color Filters Based on a Phase Compensated Etalon Enabling Adjustable Color Saturation. Scientific Reports 6, Article No. 25496 (2016); doi:10.1038/srep25496.

(Continued)

*Primary Examiner* — Thoi V Duong
(74) *Attorney, Agent, or Firm* — Patterson + Sheridan LLP (57) ABSTRACT

Embodiments described herein relate to nanostructured trans-reflective filters having sub-wavelength dimensions. In one embodiment, the trans-reflective filter includes a film stack that transmits a filtered light within a range of wavelengths and reflects light not within the first range of wavelengths. The film stack includes a first metal film disposed on a substrate having a first thickness, a first dielectric film disposed on the first metal film having a second thickness, a second metal film disposed on the first dielectric film having a third thickness, and a second dielectric film disposed on the second metal film having a fourth thickness.

20 Claims, 6 Drawing Sheets

(56) References Cited

U.S. PATENT DOCUMENTS

| | | |
|---|---|---|
| 9,547,107 B2 | 1/2017 | Guo et al. |
| 2006/0262250 A1 | 11/2006 | Hobbs |
| 2008/0174716 A1* | 7/2008 | Chen ................ G02F 1/133514 |
| | | 349/61 |
| 2011/0285942 A1 | 11/2011 | Guo et al. |
| 2012/0206580 A1 | 8/2012 | Chung et al. |
| 2014/0247415 A1* | 9/2014 | Kleptsyn ................ G02B 5/201 |
| | | 349/106 |
| 2014/0268332 A1 | 9/2014 | Guo et al. |

OTHER PUBLICATIONS

PCT Notification of Transmittal of the International Search Report and the Written Opinion of the International Searching Authority for International Application No. PCT/US2019/019590; dated Jun. 17, 2019; 14 total pages.

\* cited by examiner

NON-ABSORPTIVE TRANS-REFLECTIVE NANOSTRUCTURED RGB FILTERS

CROSS-REFERENCE TO RELATED APPLICATIONS

This application claims benefit of U.S. provisional patent application Ser. No. 62/580,000, filed Nov. 1, 2017, which is herein incorporated by reference.

BACKGROUND

Field

Embodiments of the present disclosure generally relate to apparatuses utilizing color filters. More specifically, embodiments described herein relate to nanostructured trans-reflective filters having sub-wavelength dimensions.

Description of the Related Art

Liquid crystal display (LCD) devices, complementary metal-oxide-semiconductor (CMOS) devices, semiconductor charge-coupled (CCD) devices, and other devices that require filtering of light over spectral ranges currently utilize pigment/dye based color filters. The pigment/dye based color filters allow one color or a band of colors to be transmitted while other colors that are not transmitted are absorbed by the pigment/dye based color filters.

However, pigment/dye based color filters degrade over time and are light sensitive because the absorptive filters are absorbing light that is not transmitted. The degradation and light sensitivity results in a limited life-time of the filters and a decrease of the ability of the filters to repeatedly transmit the desired color or band of colors. Furthermore, as the size of LCD devices, CMOS devices, CCD devices, and other devices that require filtering of light are becoming smaller, the demand for filters that having a smaller footprint is increasing. Additionally, display devices utilize an additive color mode with each filter transmitting either a red, green, or blue (RGB) color and printer devices utilize a subtractive color mode with cyan, magenta, and yellow (CMY) inks. In order to print an image that is represented on a display screen it is necessary to perform conversions between the color modes.

Accordingly, what is needed in the art are improved color filters and display devices.

SUMMARY

In one embodiment, a trans-reflective filter is provided. The trans-reflective filter includes a film stack that transmits a filtered light within a range of wavelengths and reflects light not within the first range of wavelengths. The film stack includes a first metal film disposed on a substrate having a first thickness, a first dielectric film disposed on the first metal film having a second thickness, a second metal film disposed on the first dielectric film having a third thickness, and a second dielectric film disposed on the second metal film having a fourth thickness.

In another embodiment, a trans-reflective filter is provided. The trans-reflective filter includes a plurality of film stacks that transmits a first filtered light within a first range of wavelengths and reflects light not within the first range of wavelengths when light perpendicular to the plurality of film stacks is directed to the trans-reflective filter, and transmits a second filtered light within a second range of wavelengths when light parallel to the plurality of film stacks is directed to the trans-reflective filter. Each film stack has a width and a pitch that allows transmission of a second filtered light within a second range of wavelengths when light parallel to the plurality of film stacks is directed to the trans-reflective filter. Each film stack includes a first metal film disposed on a substrate having a first thickness, a first dielectric film disposed on the first metal film having a second thickness, a second metal film disposed on the first dielectric film having a third thickness; and a second dielectric film disposed on the second metal film having a fourth thickness.

In yet another embodiment, a device is provided. The device includes a white light guide, a trans-reflective filter that receives light from a white light guide and is coupled to the white light guide. The trans-reflective filter includes a plurality of film stacks that transmits a filtered polarized light within a first range of wavelengths, reflects light not within the first range of wavelengths. Each film stack has a width and a pitch that restrict transmission of light parallel to the plurality of film stacks, film stack. Each film stack includes a first metal film disposed on a substrate having a first thickness, a first dielectric film disposed on the first metal film having a second thickness, a second metal film disposed on the first dielectric film having a third thickness and a second dielectric film disposed on the second metal film having a fourth thickness. The device further includes a thin-film-transistor liquid-crystal display coupled to the trans-reflective filter and a polarizer coupled to the thin-film-transistor liquid-crystal display.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to nanostructured trans-reflective filters having sub-wavelength dimensions. In one embodiment, the trans-reflective filter includes a film stack that transmits a filtered light within a range of wavelengths and reflects light not within the first range of wavelengths. The film stack includes a first metal film disposed on a substrate having a first thickness, a first dielectric film disposed on the first metal film having a second thickness, a second metal film disposed on the first dielectric film having a third thickness, and a second dielectric film disposed on the second metal film having a fourth thickness.

Figure 1:
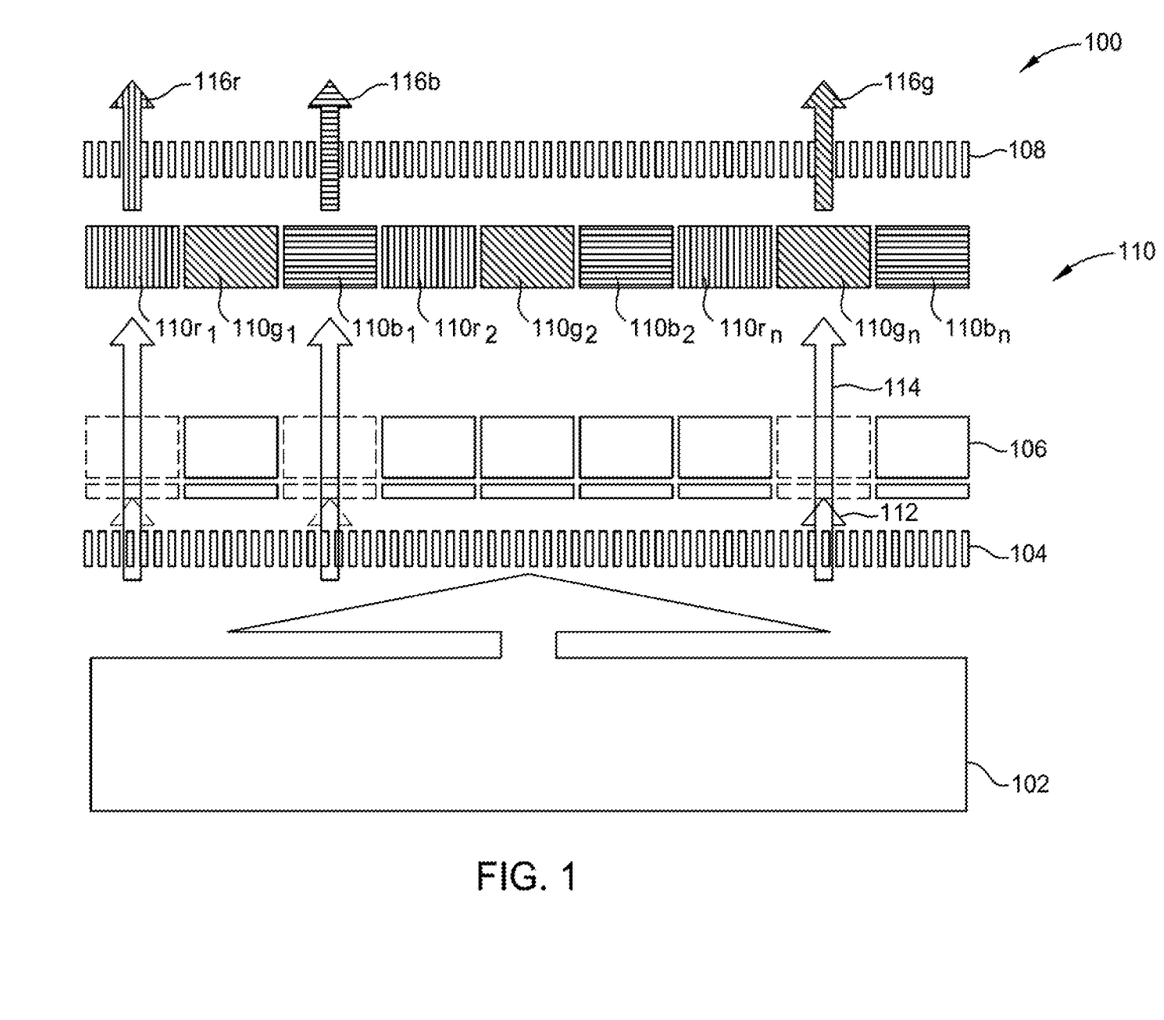
FIG. 1 is a schematic, cross-sectional view of a liquid crystal display device.

FIG. 1 is a schematic, cross-sectional view of a liquid crystal display (LCD) device 100. The LCD device 100 includes a plurality absorptive red pixels $110r_1$, $110r_2$, ..., $110r_N$, absorptive green pixels $110g_1$, $110g_2$, ..., $110g_N$, and absorptive blue pixels $110b_1$, $110b_2$, ..., $110b_N$. The plurality of absorptive red, green, and blue (RGB) pixels 110 corresponds to a RGB color mode.

Incident light 112 is directed to a first polarizer 104 by a white light guide 102 where the first polarizer 104 allows incident light 112 that is perpendicular to the first polarizer 104 to be transmitted while incident light 112 that is parallel to the first polarizer 104 is blocked. The incident light 112 that is perpendicular to the first polarizer 104 is known as cross-polarized light, and the incident light 112 that is parallel to the first polarizer 104 is known as co-polarized light. LCD pixels 106, such as thin-film-transistor liquid-crystal display (TFT-LCD) pixels, induce rotation of the incident light 112 such that a portion of the incident light 112 is co-polarized light 114 while the remaining incident light 112 is cross-polarized. The plurality of absorptive RGB pixels 110 allow one color, such as red 116r, green 116g, or blue 116b, to be transmitted while the other two colors are absorbed. A second polarizer 108 allows the one color, such as red 116r, green 116g, or blue 116b, that is co-polarized, to be transmitted.

As the plurality of absorptive RBG pixels absorb the other two colors, the plurality of absorptive RBG pixels degrade over time and are light sensitive resulting in a limited life-time of the plurality of absorptive RBG pixels and a decrease of the ability of the plurality of absorptive RBG pixels to repeatedly transmit the one color. Furthermore, in order to print an image that is represented on a display screen it is necessary to perform conversions between the RGB color mode and a CMY color mode.

Figure 2:
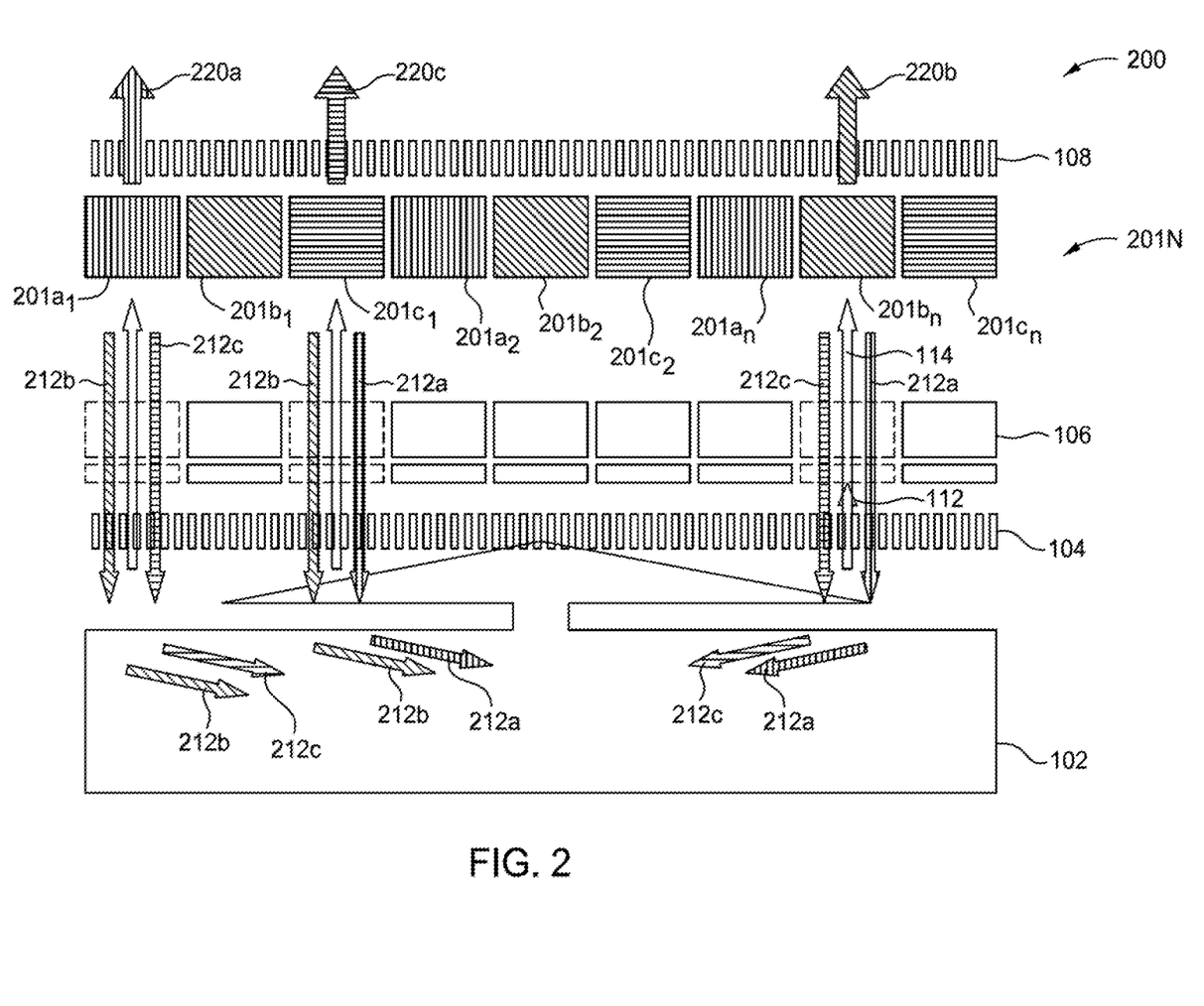
FIG. 2 is a schematic, cross-sectional view of a liquid crystal display device according to an embodiment.

FIG. 2 is a schematic, cross-sectional view of a liquid crystal display (LCD) device 200. The LCD device 200 includes a plurality of first trans-reflective filters $201a_1$, $201a_2$, ..., $201a_N$, second trans-reflective filters $201b_1$, $201b_2$, ..., $201b_N$, and third trans-reflective filters $201c_1$, $201c_2$, ..., $201c_N$.

Incident light 112 is directed to a first polarizer 104 by a white light guide 102 where the first polarizer 104 allows incident light 112 that is perpendicular to the first polarizer 104 to be transmitted while incident light 112 that is parallel to the first polarizer 104 is blocked. The incident light 112 that is perpendicular to the first polarizer 104 is known as cross-polarized light, and the incident light 112 that is parallel to the first polarizer 104 is known as co-polarized light. LCD pixels 106, such as thin-film-transistor liquid-crystal display (TFT-LCD) pixels, induce rotation of the incident light 112 such that a portion of the incident light 112 is co-polarized light 114 while the remaining incident light 112 is cross-polarized. The plurality of trans-reflective filters $201_N$ receives the co-polarized light 114 and transmits filtered lights 220a, 220b, 220c within first ranges of wavelengths and reflects lights 212a, 212b, 212c not within the first ranges of wavelengths to the white light guide 102. The lights 212a, 212b, 212c not within the first ranges of wavelengths are redirected to the first polarizer 104 as the incident light 112. A second polarizer 108 allows the filtered lights 220a, 220b, 220c that are co-polarized to be transmitted.

Figure 3:
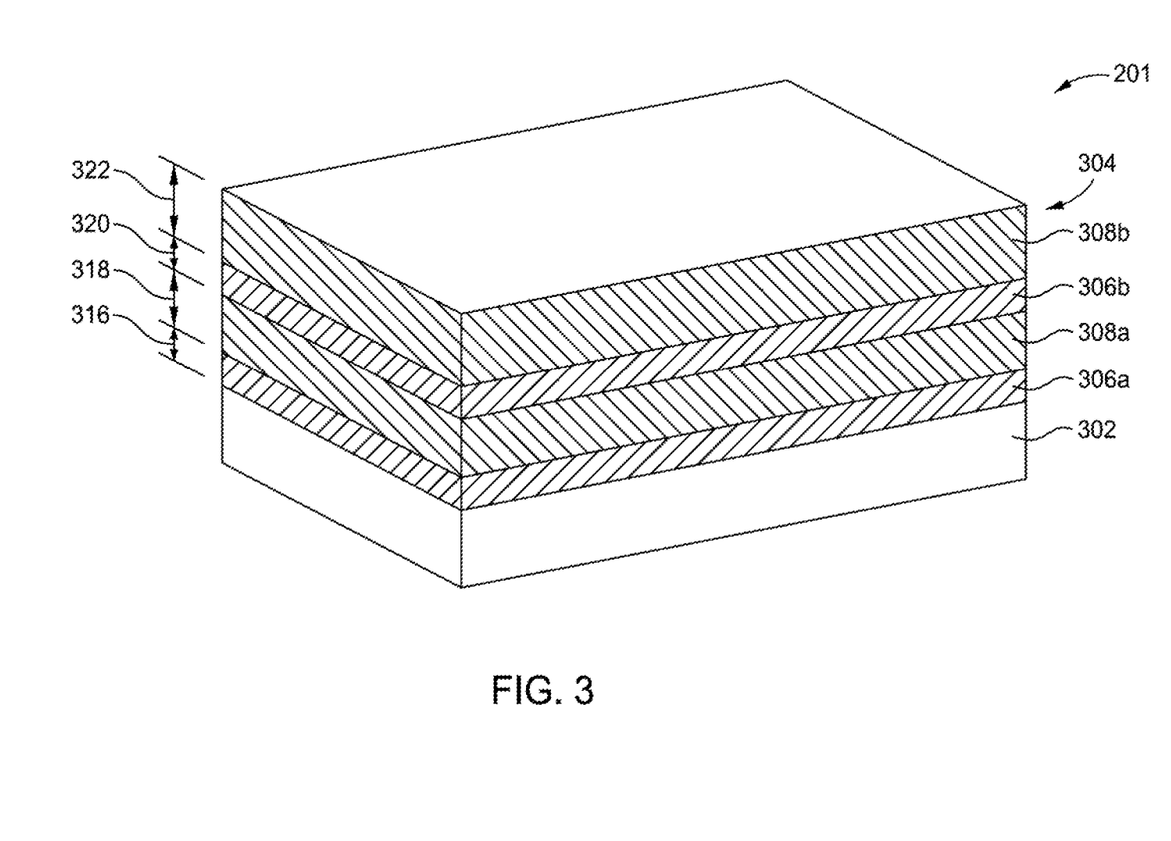
FIG. 3 is a schematic, isometric view of a trans-reflective filter that is polarization insensitive according to an embodiment.

FIG. 3 is a schematic, isometric view of a trans-reflective filter 201 that is polarization insensitive. A film stack 304 includes a first metal film 306a disposed on a substrate 302 having a first thickness 316, a first dielectric film 308a disposed on the first metal film 306a having a second thickness 318, a second metal film 306b disposed on the first dielectric film 308a having a third thickness 320, and a second dielectric film 308b disposed on the second metal film 306b having a fourth thickness 322. The first metal film 306a and second metal film 306b may comprise silver (Ag) or any other highly reflective material. In one embodiment, the first metal film 306a and second metal film 306b consist of the same material. The first thickness 316 and the third thickness 320 are about 15 nm to about 30 nm. In one embodiment, the first thickness 316 and the third thickness 320 are substantially the same, such as 25 nm. Increasing the thickness of the first metal film 306a and second metal film 306b narrows the bandwidth of the transmission peak, but decreases the amplitude of the transmission peak. The first dielectric film 308a and second dielectric film 308b may comprise titanium dioxide ($TiO_2$) or any other material with high refractive index and low extinction coefficient. In one embodiment, the first dielectric film 308a and second dielectric film 308b consist of the same material. The second thickness 318 is about 35 nm to about 90 nm and the fourth thickness 322 is about 30 nm to about 100 nm. In one embodiment, the second thickness 318 and the fourth thickness 322 are different.

The first thickness 316 of the first metal film 306a, the second thickness 318 of the first dielectric film 308a, the third thickness 320 of the second metal film 306b, and the fourth thickness 322 of the second dielectric film 308b are controlled to transmit filtered lights 220a, 220b, 220c within first ranges of wavelengths and reflects lights 212a, 212b, 212c not within the first ranges of wavelengths with an efficiency greater than 70%.

The first metal film 306a, the first dielectric film 308a, and the second metal film 306b form a phase compensated etalon designed with specific thicknesses to transmit a first range of wavelengths. The second thickness 318 decides the peak wavelength for transmission. The first thickness 316 and the third thickness 320 decide the bandwidth of the transmission spectra. The second dielectric film 308b with a fourth thickness 322 functions as an antireflection coating in addition to providing encapsulation to the first metal film 306a, the first dielectric film 308a, and the second metal film 306b. In one embodiment, the refractive indices and the thicknesses of the four films are chosen to transmit light within first ranges of wavelengths and reflect light not within the first range of wavelengths.

In one embodiment, the first metal film 306a consists of Ag and has a first thickness 316 of about 25 nm. The first dielectric film 308a consists of $TiO_2$ and has a second thickness 318 of about 75 nm. The second metal film 306*b* consists of Ag and has a third thickness 320 of about 25 nm. The second dielectric film 308*b* consists of TiO$_2$ and has a fourth thickness 322 of about 70 nm. The film stack 304 transmits a filtered light 220*a* within a first range of wavelengths and reflects lights 212*b*, 212*c* not within the first range of wavelengths to the white light guide 102. The filtered light 220*a* is within a first range of wavelengths of about 592 nm to about 652 nm. The first range of wavelengths corresponds to a peak wavelength of about 630 nm (red color) with a full width at half maximum of about 65 nm. About 63% of the incident light 112 is transmitted at the peak wavelength and less than 6% of light not within first range of wavelengths is transmitted.

In another embodiment, the first metal film 306*a* consists of Ag and has a first thickness 316 of about 25 nm. The first dielectric film 308*a* consists of TiO2 and has a second thickness 318 of about 60 nm. The second metal film 306*b* consists of Ag and has a third thickness 320 of about 25 nm. The second dielectric film 308*b* consists of TiO2 and has a fourth thickness 322 of about 52 nm. The film stack 304 transmits a filtered light 220*b* within a first range of wavelengths and reflects lights 212*a*, 212*c* not within the first range of wavelengths to the white light guide 102. The filtered light 220*a* is within a range first of wavelengths of about 505 nm to about 561 nm. The first range of wavelengths corresponds to a peak wavelength of about 533 nm (green color) with a full width at half maximum of about 65 nm. About 70% of the first range of wavelengths is transmitted and less than 12% of light not within the first range of wavelengths is transmitted.

In yet another embodiment, the first metal film 306*a* consists of Ag and has a first thickness 316 of about 25 nm. The first dielectric film 308*a* consists of TiO2 and has a second thickness 318 of about 35 nm. The second metal film 306*b* consists of Ag and has a third thickness 320 of about 25 nm. The second dielectric film 308*b* consists of TiO2 and has a fourth thickness 322 of about 36 nm. The film stack 304 transmits a filtered light 220*c* within a first range of wavelengths and reflects lights 212*a*, 212*b* not within the first range of wavelengths to the white light guide 102. The filtered light 220*a* is within a first range of wavelengths of about 448 nm to about 502 nm. The first range of wavelengths corresponds to a peak wavelength of about 434 nm (blue color) with a full width at half maximum of about 65 nm. About 68% of the first range of wavelengths is transmitted and less than 19% of light not within the first range of wavelengths is transmitted.

Figure 4:
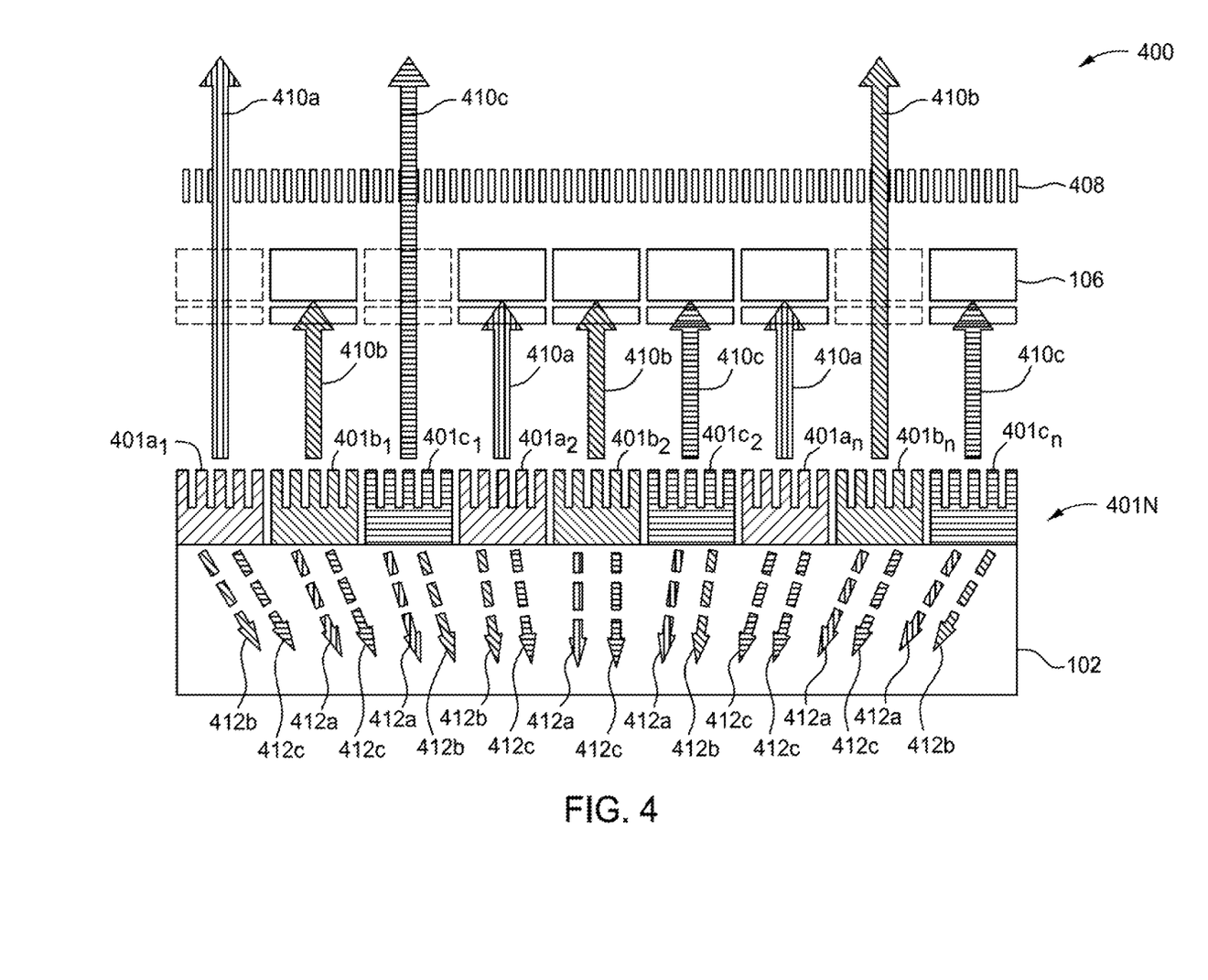
FIG. 4 is a schematic, cross-sectional view of a liquid crystal display device according to an embodiment.

FIG. 4 is a schematic, cross-sectional view of a liquid crystal display (LCD) device 400. The LCD device 400 includes a plurality of first trans-reflective filters 401$a_1$, 401$a_2$, . . . , 401$a_N$, second trans-reflective filters 401$b_1$, 401$b_2$, . . . , 401$b_N$, and third trans-reflective filters 401$c_1$, 401$c_2$, . . . , 401$c_N$. In one embodiment, the plurality of trans-reflective filters 401$_N$ are polarization sensitive and coupled to the white light guide 102.

Figure 5:
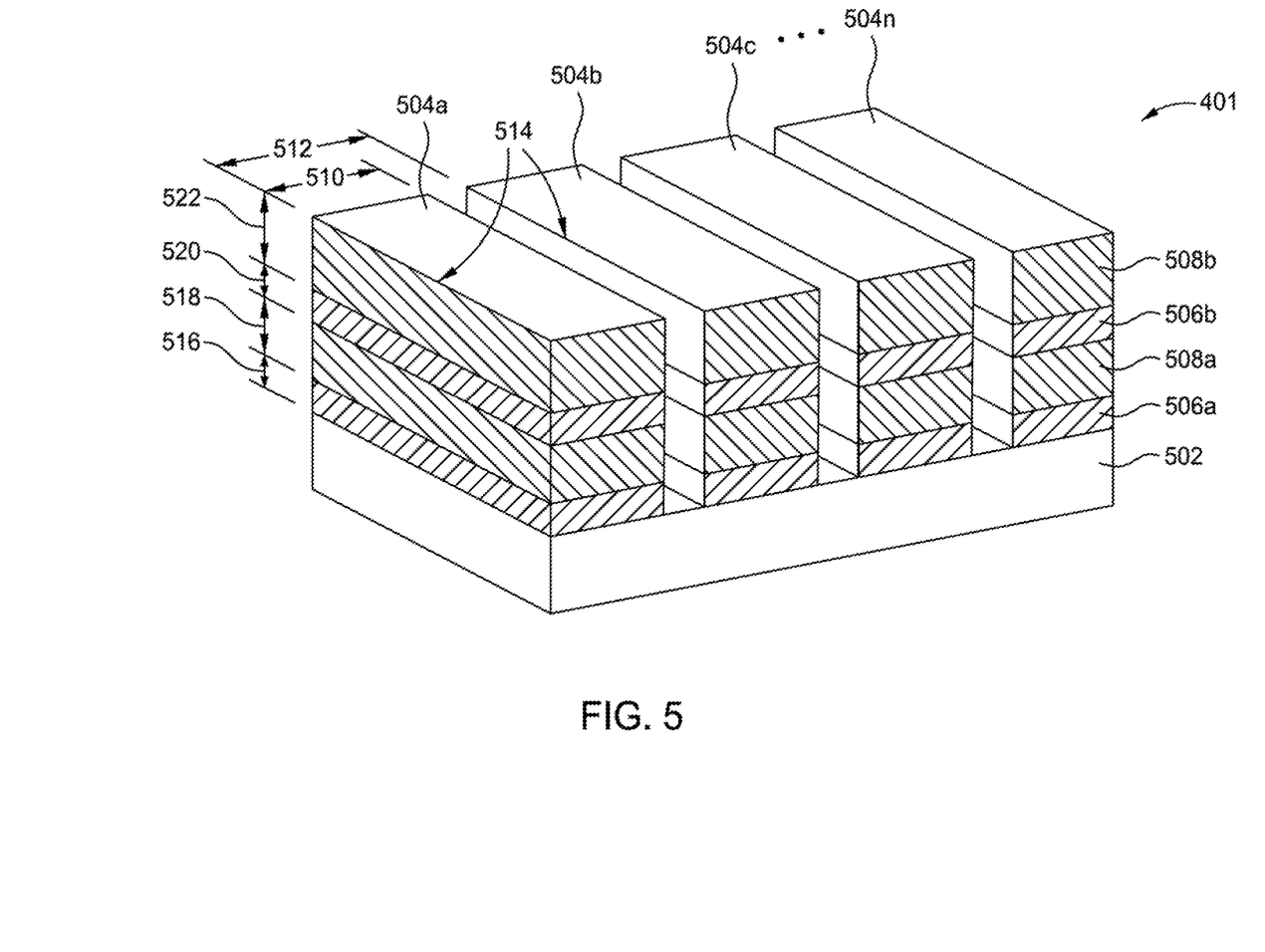
FIG. 5 is a schematic, isometric view of a trans-reflective filter that is polarization sensitive according to an embodiment.

The plurality of trans-reflective filters 401$_N$, also known as a metasurface, receives incident light 112 (not shown) from the white light guide 102. As shown in FIG. 5, each trans-reflective filter 401, includes a plurality of film stacks 504 formed on a substrate 502 that transmits filtered polarized lights 410*a*, 410*b*, 410*c* within a first range of wavelengths that are cross-polarized, reflects lights 412*a*, 412*b*, 412*c* not within the first range of wavelengths to the white light guide 102, and restricts transmission of incident light 112 (not shown) parallel and co-polarized to the plurality of film stacks 504. LCD pixels 106, such as thin-film-transistor liquid-crystal display (TFT-LCD) pixels, induce rotation of the filtered polarized lights 410*a*, 410*b*, 410*c* such that portions of the filtered polarized lights 410*a*, 410*b*, 410*c* are co-polarized while the remaining portions of the filtered polarized lights 410*a*, 410*b*, 410*c* remain cross-polarized. A polarizer 408 allows the portion of the filtered polarized lights 410*a*, 410*b*, 410*c* that are co-polarized to be transmitted while the remaining filtered polarized lights 410*a*, 410*b*, 410*c* that are cross-polarized are blocked. Accordingly, the LCD device 400 including the plurality trans-reflective filters 401$_N$ experiences reduced light loss and thus increased efficiency. For example, the LCD device 100 including plurality of absorptive RGB pixels 110 loses as much as of ⅔ of the light introduced to the LCD device 100 during operation. The LCD device 400 emits about 70% to about 95% of the light introduced to the LCD device 400 during operation. Therefore, the efficiency of the LCD device 400 may be increased up to 3 times.

FIG. 5 is a schematic, isometric view of a trans-reflective filter 401. The trans-reflective filter 401 includes a plurality of film stacks 504. The film stacks 504*a*, 504*b*, 504*c*, . . . , 504*n* have a width 510 and a pitch 512. The pitch 512 is determined from a distance from a first edge 514 of a first film stack 504*a* to the first edge 514 of an adjacent first stack 504*b*. The width 510 and the pitch 512 are controlled to restrict transmission of incident light 112 (not shown) parallel and co-polarized to the plurality of film stacks 504. The film stacks 504*a*, 504*b*, 504*c*, . . . , 504*n* include a first metal film 506*a* disposed on a substrate 502 having a first thickness 516, a first dielectric film 508*a* disposed on the first metal film 506*a* having a second thickness 518, a second metal film 506*b* disposed on the first dielectric film 508*a* having a third thickness 520, and a second dielectric film 508*b* disposed on the second metal film 506*b* having a fourth thickness 522. The co-polarized light induces free movement of the electrons in the first metal film 506*a* and in the second metal film 506*b* effectively making the film stacks behave like continuous metal films that would reflect light, and therefore restrict transmission.

The first metal film 506*a* and second metal film 506*b* may comprise silver (Ag) or any other highly reflective material. In one embodiment, the first metal film 506*a* and second metal film 506*b* consist of the same material. The first thickness 516 and the third thickness 520 are about 25 nm to about 40 nm. In one embodiment the first thickness 516 and the third thickness 520 are substantially the same, such as 25 nm. The first dielectric film 508*a* and second dielectric film 508*b* may comprise titanium dioxide (TiO$_2$) or any other material with high refractive index but low extinction coefficient. In one embodiment, the first dielectric film 508*a* and second dielectric film 508*b* consist of the same material. The second thickness 518 is about 35 nm to about 100 nm and the fourth thickness 522 is about 35 nm to about 100 nm. In one embodiment, the second thickness 518 and the fourth thickness 522 are different. The first thickness 516 of the first metal film 506*a*, the second thickness 518 of the first dielectric film 508*a*, the third thickness 520 of the second metal film 506*a*, and the fourth thickness 522 of the second dielectric film 508*b* are controlled to transmit the filtered polarized lights 410*a*, 410*b*, 410*c* within the first ranges of wavelengths and reflect the lights 412*a*, 412*b*, 412*c* not within the first ranges of wavelengths. The first metal film 506*a*, the first dielectric film 508*a*, and the second metal film 506*b* form a resonator that transmits a range of wavelengths depending on the material property and thickness of the films. The second dielectric film functions as an antireflection coating in addition to providing encapsulation to the first metal film 306a, the first dielectric film 308a, and the second metal film 306b. The plurality of film stacks 504 has a width 510 of about 10 nm to about 45 nm and a pitch 512 of about 115 nm to about 160 nm.

In one embodiment, the plurality of film stacks 504 has a width 510 of about 40 nm and a pitch 512 of about 115 nm. The first metal film 506a and second metal film 506b consist of Ag and has a first thickness 516 of about 25 nm. The first dielectric film 508a consists of $TiO_2$ and has a second thickness 518 of about 85 nm. The second metal film 506b consists of Ag and has a third thickness 520 of about 25 nm. The second dielectric film 508b consists of $TiO_2$ and has a fourth thickness 522 of about 75 nm. The plurality of film stacks 504 transmits a filtered polarized light 410a within a first range of wavelengths, reflects lights 412b, 412c not within the first range of wavelengths to the white light guide for recycling, and restricts transmission of at least 60% of incident light parallel to the plurality of film stacks 504. The filtered polarized light 410a is within a first range of wavelengths of about 565 nm to about 695 nm. The first range of wavelengths corresponds to a peak wavelength of about 630 nm corresponding to a red color, with a full width at half maximum of 130 nm. About 82% of the peak wavelength within the first range of wavelengths is transmitted, while about 52% of light at a wavelength of about 572 nm (green color) and about 84% of light at a wavelength about of 470 nm (blue color) are reflected to the white light guide 102, for cross-polarized light. For co-polarized light less than 40% of light is transmitted throughout the wavelength range 400 nm to 700 nm In another embodiment, the plurality of film stacks 504 has a width 510 of about 40 nm and a pitch 512 of about 115 nm. The first metal film 506a and second metal film 506b consist of Ag and has a first thickness 516 of about 25 nm. The first dielectric film 508a consists of $TiO_2$ and has a second thickness 518 of about 65 nm. The second metal film 506b consists of Ag and has a third thickness 520 of about 25 nm. The second dielectric film 508b consists of $TiO_2$ and has a fourth thickness 522 of about 90 nm. The plurality of film stacks 504 transmits a filtered polarized light 410b within a first range of wavelengths, reflects lights 412a, 412c not within the first range of wavelengths to the white light guide for recycling, and restricts transmission of about 60% of incident light parallel to the plurality of film stacks. The filtered polarized light 410b is within a first range of wavelengths of about 513 nm to about 631 nm. The first range of wavelengths corresponds to a peak wavelength of about 572 nm corresponding to a green color, with a full width at half maximum of 118 nm. About 80% of the peak wavelength within the first range of wavelengths is transmitted, about 41% of light at a wavelength of about 630 nm (red color) and about 77% of light at a wavelength of about 470 nm (blue color) are reflected to the white light guide 102, for cross-polarized light. For co-polarized light less than 40% of light is transmitted throughout the wavelength range 400 nm to 700 nm In yet another embodiment, the plurality of film stacks 504 has a width 510 of about 40 nm and a pitch 512 of about 115 nm. The first metal film 506a and second metal film 506b consist of Ag and has a first thickness 516 of about 25 nm. The first dielectric film 508a consists of $TiO_2$ and has a second thickness 518 of about 45 nm. The second metal film 506b consists of Ag and has a third thickness 520 of about 25 nm. The second dielectric film 508b consists of $TiO_2$ and has a fourth thickness 522 of about 60 nm. The plurality of film stacks 504 transmits a filtered polarized light 410c within a first range of wavelengths, reflects lights 412a, 412b not within the first range of wavelengths to the white light guide, and restricts transmission of about 60% of incident light parallel to the plurality of film stacks 504. The filtered polarized light 410c is within a first range of wavelengths of about 416 nm to about 524 nm corresponding to a blue color (470 nm). The first range of wavelengths corresponds to a peak wavelength of about 470 nm corresponding to a blue color, with a full width at half maximum of 108 nm. About 81% of the peak wavelength within the first range of wavelengths is transmitted, about 67% of light at a wavelength of about 630 nm (red color) and about 58% of light at a wavelength of about 572 nm (green color) are reflected to the white light guide 102, for cross-polarized light. For co-polarized light, less than 35% of light is transmitted throughout the wavelength range 400 nm to 700 nm.

FIGS. 6A-6E are schematic, cross-sectional views of trans-reflective filters 401 that are switchable between an additive color mode and a subtractive color mode. The width 510, the pitch 512, and film thicknesses are controlled to transmit second filtered lights 614a, 614b, 614c within second ranges of wavelengths corresponding to subtractive colors when incident light is parallel to the plurality of film stacks 504. The first thickness 516 of the first metal film 506a, the second thickness 518 of the first dielectric film 508a, the third thickness 520 of the second metal film 506b, and the fourth thickness 522 of the second dielectric film 508b are controlled to transmit first filtered lights 610a, 610b, 610c within first ranges of wavelengths and reflect lights 612a, 612b, 612c not within the first ranges of wavelengths when incident light is perpendicular the plurality of film stacks 504.

Figure 6A:
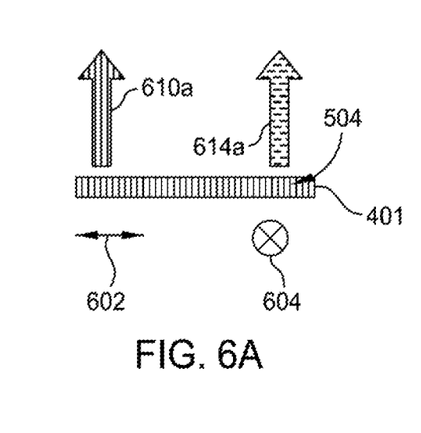
FIGS. 6A and 6B are schematic, cross-sectional views of a trans-reflective filter that is switchable between a red color of an additive color mode and cyan color of a subtractive color mode according to an embodiment.
Figure 6B:
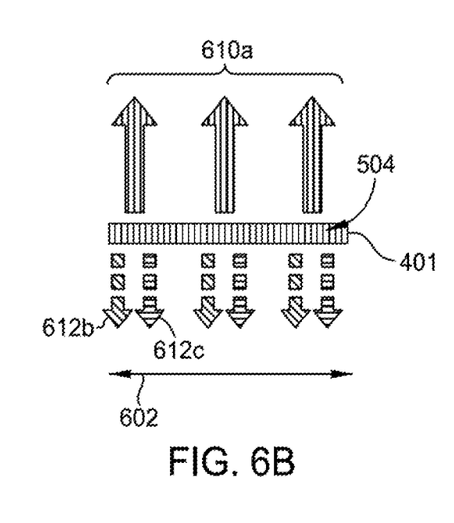

FIGS. 6A and 6B are schematic, cross-sectional views of a trans-reflective filter 401 that is switchable between a red color of an additive color mode and cyan color of a subtractive color mode. In one embodiment, the plurality of film stacks 504 has a width 510 of about 50 nm and a pitch 512 of about 100 nm. The first metal film 506a consists of Ag and has a first thickness 516 of about 40 nm. The first dielectric film 508a consists of $TiO_2$ and has a second thickness 518 of about 90 nm. The second metal film 506b consists of Ag and has a third thickness 520 of about 40 nm. The second dielectric film 508b consists of $TiO_2$ and has a fourth thickness 522 of about 85 nm. As shown in FIGS. 6A and 6B, when incident light is perpendicular the plurality of film stacks 504, cross-polarized light 602, the plurality of film stacks 504 transmits a first filtered light 610a within a first range of wavelengths and reflects reflected lights 612a, 612b not within the first range of wavelengths. The first filtered light 610a is within a first range of wavelengths. The first range of wavelengths corresponds to a peak wavelength of about 644 nm (red color) with a full width at half maximum of about 105 nm. About 77% of the incident light is transmitted at 644 nm (red color), and about 80% of light at a wavelength of 560 nm (green color) and about 84% of light at a wavelength of 460 nm (blue color) are reflected to the white light guide 102. As shown in FIG. 6A, when incident light is parallel to the plurality of film stacks 504, co-polarized light 604, the plurality of film stacks 504 transmits more than 50% of the incident light as a second filtered light 614a within a second range of wavelengths of about 400 nm to about 577 nm corresponding to the cyan color.

Figure 6C:
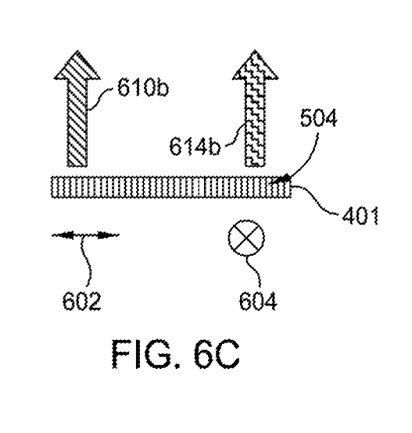
FIGS. 6C and 6D are schematic, cross-sectional views of a trans-reflective filter that is switchable between a green color of an additive color mode and yellow color of a subtractive color mode according to an embodiment.
Figure 6D:
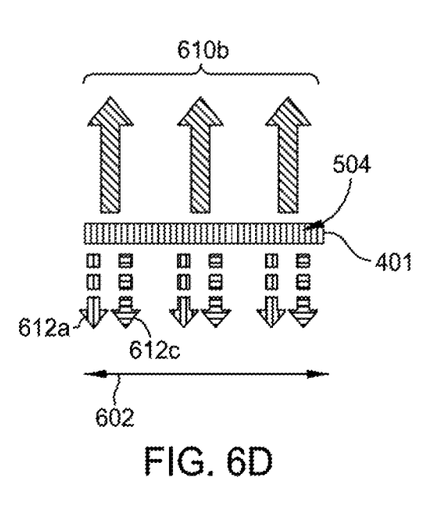

FIGS. 6C and 6D are schematic, cross-sectional views of a trans-reflective filter 401 that are switchable between a green color of an additive color mode and yellow color of a subtractive color mode. In one embodiment, the plurality of film stacks 504 has a width 510 of about 60 nm and a pitch 512 of about 120 nm. The first metal film 506a consists of Ag and has a second thickness 518 of about 25 nm. The first dielectric film 508a consists of $TiO_2$ and has a third thickness 520 of about 65 nm. The second metal film 506b consists of Ag and has a third thickness 520 of about 25 nm. The second dielectric film 508b consists of $TiO_2$ and has a fourth thickness 522 of about 90 nm. As shown in FIGS. 6C and 6D, when incident light is perpendicular the plurality of film stacks 504, cross-polarized light 602, the plurality of film stacks 504 transmits a first filtered light 610b within a first range of wavelengths and reflects reflected lights 612a, 612c not within the first range of wavelengths. The first filtered light 610b is within a first range of wavelengths. The first range of wavelengths corresponds to a peak wavelength of about 555 nm (green color) with a full width at half maximum of about 105 nm. About 86% of the incident light is transmitted at 555 nm (green color), and about 40% of light having a peak wavelength of about 644 nm (red color) and about 67% of light having a peak wavelength of about 460 nm (blue color) are reflected to the white light guide 102. As shown in FIG. 6C, when incident light is parallel to the plurality of film stacks 504, co-polarized light 604, the plurality of film stacks 504 transmits more than 50% of the incident light as a second filtered light 614b within a second range of wavelengths of about 555 nm to about 682 nm corresponding to a yellow color.

Figure 6E:
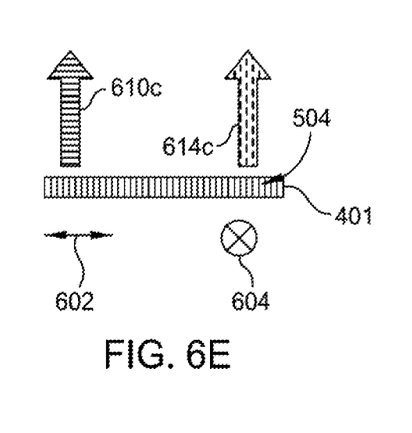
FIGS. 6E and 6F are schematic, cross-sectional views of a trans-reflective filter that is switchable between a blue color of an additive color mode and magenta color of a subtractive color mode according to an embodiment.
Figure 6F:
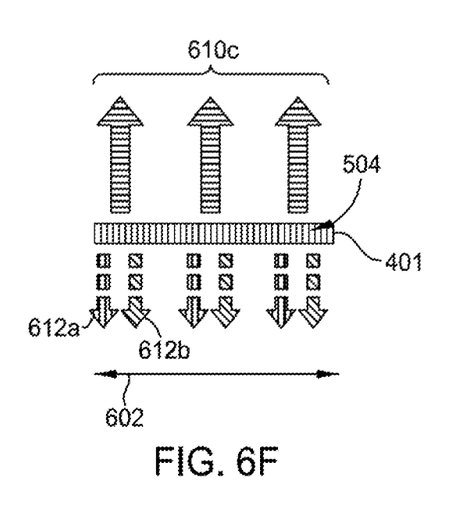

FIGS. 6E and 6F are schematic, cross-sectional views of trans-reflective filter 401 that is switchable between a blue color of an additive color mode and magenta color of a subtractive color mode. In one embodiment, the plurality of film stacks 504 has a width 510 of about 70 nm and a pitch 512 of about 140 nm. The first metal film 506a consists of Ag and has a first thickness 516 of about 25 nm. The first dielectric film 508a consists of $TiO_2$ and has a second thickness 518 of about 40 nm. The second metal film 506b consists of Ag and has a third thickness 520 of about 25 nm. The second dielectric film 508b consists of $TiO_2$ and has a fourth thickness 522 of about 95 nm. As shown in FIGS. 6E and 6F, when incident light is perpendicular the plurality of film stacks 504, cross-polarized light 602, the plurality of film stacks 504 transmits a first filtered light 610c within a first range of wavelengths and reflects reflected lights 612a, 612b not within the first range of wavelengths. The first filtered light 610c is within a first range of wavelengths. The first range of wavelengths corresponds to a peak wavelength of about 460 nm (blue color) with a full width at half maximum of about 105 nm. About 79% of the incident light is transmitted at 460 nm (blue color), and about 76% of light having a peak wavelength of about 644 nm (red color) and about 62% of light having a peak wavelength of about 555 nm (green color) are reflected to the white light guide 102. As shown in FIG. 6E, when incident light is parallel to the plurality of film stacks 504, co-polarized light 604, the plurality of film stacks 504 transmits more than 50% of the incident light as a second filtered light 614c within a second range of wavelengths of about 400 nm to about 495 nm and a third range of wavelengths of about 615 nm to about 700 nm corresponding to a magenta color.

In summation, improved color filters and display devices are described herein. The trans-reflective filters have a total thickness of about 100 nm, 10 times less than the total thickness of pigment/dye based filters and may be utilized as pixels in a Color Filter Array (CFA) having variable pixels sizes of the order of 100 nm or less. Trans-reflective filters having sub-wavelength dimensions allow for customizable spectral sensitivity by selecting a transmission peak through adjusting the dimensions of the films. Additionally, utilizing film stacks with sub-wavelength dimensions allow for polarization specific filtering. The film stacks can have sub-wavelength dimensions that restrict co-polarized light allowing the reduction of display device thicknesses by eliminating the need for a first polarizer. The film stacks can have sub-wavelength dimensions that allow for polarization specific color filtering between additive and subtractive color modes.

While the foregoing is directed to examples of the present disclosure, other and further examples of the disclosure may be devised without departing from the basic scope thereof, and the scope thereof is determined by the claims that follow.

What is claimed is:

1. A first trans-reflective filter of a device having a plurality of trans-reflective filters, the first trans-reflective filter comprising:
   a plurality of film stacks that transmits a first filtered light within a first range of wavelengths and reflects light not within the first range of wavelengths when light perpendicular to the plurality of film stacks is directed to the first trans-reflective filter of the device, and transmits a second filtered light within a second range of wavelengths when light parallel to the plurality of film stacks is directed to the first trans-reflective filter of the device, each film stack has a width and a pitch that allow transmission of the second filtered light within the second range of wavelengths when light parallel to the plurality of film stacks is directed to the first trans-reflective filter of the device, each film stack comprises:
   a first metal film disposed on a substrate having a first thickness;
   a first dielectric film disposed on the first metal film having a second thickness;
   a second metal film disposed on the first dielectric film having a third thickness; and
   a second dielectric film disposed on the second metal film having a fourth thickness.

2. The first trans-reflective filter of claim 1, wherein:
   the first metal film and second metal film comprise silver (Ag); and
   the first dielectric film and second dielectric film comprise titanium oxide ($TiO_2$).

3. The first trans-reflective filter of claim 1, wherein:
   the width is about 50 nm and the pitch is about 100 nm;
   the first metal film and the second metal film consist essentially of Ag;
   the first thickness and third thickness are about 40 nm;
   the first dielectric film and the second dielectric film consist essentially of $TiO_2$;
   the second thickness is about 90 nm and the fourth thickness is about 85 nm;
   the first range of wavelengths corresponds to a peak wavelength of about 644 nm with a full width at half maximum of about 105 nm;
   the first filtered light corresponds to a red color and the light perpendicular to the plurality of film stacks corresponds to cross-polarized light;
   the second range of wavelengths is about 400 nm to about 577 nm; and
   the second filtered light corresponds to a cyan color and the light parallel to the plurality of film stacks corresponds to co-polarized light.

4. The first trans-reflective filter of claim 1, wherein:
the width is about 60 nm and the pitch is about 120 nm;
the first metal film and the second metal film consist essentially of Ag;
the first thickness and third thickness are about 25 nm;
the first dielectric film and the second dielectric film consist essentially of $TiO_2$;
the second thickness is about 65 nm and the fourth thickness is about 90 nm;
the first range of wavelengths corresponds to a peak wavelength of about 555 nm with a full width at half maximum of about 105 nm;
the first filtered light corresponds to a green color and the light perpendicular to the plurality of film stacks corresponds to cross-polarized light;
the second range of wavelengths is about 555 nm to about 682 nm; and
the second filtered light corresponds to a yellow color and the light parallel to the plurality of film stacks corresponds to co-polarized light.

5. The first trans-reflective filter of claim 1, wherein:
the width is about 70 nm and the pitch is about 140 nm;
the first metal film and the second metal film consist essentially of Ag;
the first thickness and third thickness are about 25 nm;
the first dielectric film and the second dielectric film consist essentially of $TiO_2$;
the second thickness is about 40 nm and the fourth thickness is about 95 nm;
the first range of wavelengths corresponds to a peak wavelength of about 460 nm with a full width at half maximum of about 105 nm;
the first filtered light corresponds to a blue color and the light perpendicular to the plurality of film stacks corresponds to cross-polarized light;
the second range of wavelengths comprises a range of about 400 nm to about 495 nm or 615 nm to about 700 nm; and
the second filtered light corresponds to a magenta color and the light parallel to the plurality of film stacks corresponds to co-polarized light.

6. A device, comprising:
a white light guide;
a first trans-reflective filter that receives light from the white light guide and is coupled to the white light guide, the first trans-reflective filter comprises a first plurality of film stacks that transmits a first filtered polarized light within a first range of wavelengths and reflects light not within the first range of wavelengths when light perpendicular to the first plurality of film stacks is directed to the first trans-reflective filter of the device, and transmits a second filtered light within a second range of wavelengths when light parallel to the first plurality of film stacks is directed to the first trans-reflective filter of the device, each film stack has a width and a pitch that allow transmission of the second filtered light within the second range of wavelengths when light parallel to the first plurality of film stacks is directed to the first trans-reflective filter of the device, each film stack comprises:
a first metal film disposed on a substrate having a first thickness;
a first dielectric film disposed on the first metal film having a second thickness;
a second metal film disposed on the first dielectric film having a third thickness; and
a second dielectric film disposed on the second metal film having a fourth thickness;
a second trans-reflective filter that receives light from the white light guide and is coupled to the white light guide, the second trans-reflective filter comprises a second plurality of film stacks;
a third trans-reflective filter that receives light from the white light guide and is coupled to the white light guide, the third trans-reflective filter comprises a third plurality of film stacks;
a thin-film-transistor liquid-crystal display coupled to the first, second, and third trans-reflective filters; and
a polarizer coupled to the thin-film-transistor liquid-crystal display.

7. The device of claim 6, wherein the first plurality of film stacks restricts transmission of at least 60% of the light parallel to the first plurality of film stacks.

8. The device of claim 6, wherein:
the first metal film and second metal film comprise silver (Ag); and
the first dielectric film and second dielectric film comprise titanium oxide ($TiO_2$).

9. The device of claim 6, wherein:
the first thickness and third thickness are about 25 nm to about 40 nm;
the second thickness is about 35 nm to about 100 nm; and
the fourth thickness are about 35 nm to about 100 nm.

10. A device, comprising:
a white light guide;
a first trans-reflective filter that receives light from the white light guide and is coupled to the white light guide, the first trans-reflective filter comprises a first plurality of film stacks that transmits a filtered polarized light within a first range of wavelengths, reflects light not within the first range of wavelengths, each film stack has a width and a pitch that restrict transmission of light parallel to the first plurality of film stacks, wherein:
the width is about 10 nm to about 45 nm; and
the pitch is about 115 nm to about 160 nm;
each film stack comprises:
a first metal film disposed on a substrate having a first thickness;
a first dielectric film disposed on the first metal film having a second thickness;
a second metal film disposed on the first dielectric film having a third thickness; and
a second dielectric film disposed on the second metal film having a fourth thickness;
a second trans-reflective filter that receives light from the white light guide and is coupled to the white light guide, the second trans-reflective filter comprises a second plurality of film stacks;
a third trans-reflective filter that receives light from the white light guide and is coupled to the white light guide, the third trans-reflective filter comprises a third plurality of film stacks;
a thin-film-transistor liquid-crystal display coupled to the first, second, and third trans-reflective filters; and
a polarizer coupled to the thin-film-transistor liquid-crystal display.

11. A device, comprising:
a white light guide;
a first trans-reflective filter that receives light from the white light guide and is coupled to the white light guide, the first trans-reflective filter comprises a first plurality of film stacks that transmits a filtered polarized light within a first range of wavelengths, reflects light not within the first range of wavelengths, each film stack has a width and a pitch that restrict transmission of light parallel to the first plurality of film stacks, each film stack comprises:
  a first metal film disposed on a substrate having a first thickness;
  a first dielectric film disposed on the first metal film having a second thickness;
  a second metal film disposed on the first dielectric film having a third thickness; and
  a second dielectric film disposed on the second metal film having a fourth thickness;
a second trans-reflective filter that receives light from the white light guide and is coupled to the white light guide, the second trans-reflective filter comprises a second plurality of film stacks;
a third trans-reflective filter that receives light from the white light guide and is coupled to the white light guide, the third trans-reflective filter comprises a third plurality of film stacks;
a thin-film-transistor liquid-crystal display coupled to the first, second, and third trans-reflective filters; and
a polarizer coupled to the thin-film-transistor liquid-crystal display, wherein:
the width is about 40 nm and the pitch is about 115 nm;
the first metal film and the second metal film consist essentially of Ag;
the first thickness and third thickness are about 25 nm;
the first dielectric film and the second dielectric film consist essentially of TiO$_2$;
the second thickness is about 85 nm and the fourth thickness is about 75 nm;
the light parallel to the first plurality of film stacks corresponds to co-polarized light;
the first range of wavelengths is about 565 nm to about 695 nm; and
the filtered polarized light corresponds to a red color of about 630 nm.

12. A device, comprising:
a white light guide;
a first trans-reflective filter that receives light from the white light guide and is coupled to the white light guide, the first trans-reflective filter comprises a first plurality of film stacks that transmits a filtered polarized light within a first range of wavelengths, reflects light not within the first range of wavelengths, each film stack has a width and a pitch that restrict transmission of light parallel to the first plurality of film stacks, each film stack comprises:
  a first metal film disposed on a substrate having a first thickness;
  a first dielectric film disposed on the first metal film having a second thickness;
  a second metal film disposed on the first dielectric film having a third thickness; and
  a second dielectric film disposed on the second metal film having a fourth thickness;
a second trans-reflective filter that receives light from the white light guide and is coupled to the white light guide, the second trans-reflective filter comprises a second plurality of film stacks;
a third trans-reflective filter that receives light from the white light guide and is coupled to the white light guide, the third trans-reflective filter comprises a third plurality of film stacks;
a thin-film-transistor liquid-crystal display coupled to the first, second, and third trans-reflective filters; and
a polarizer coupled to the thin-film-transistor liquid-crystal display, wherein:
the width is about 40 nm and the pitch is about 115 nm;
the first metal film and the second metal film consist essentially of Ag;
the first thickness and third thickness are about 25 nm;
the first dielectric film and the second dielectric film consist essentially of TiO$_2$;
the second thickness is about 65 nm and the fourth thickness is about 90 nm;
the light parallel to the first plurality of film stacks corresponds to co-polarized light;
the first range of wavelengths is about 513 nm to about 631 nm; and
the filtered polarized light corresponds to a green color of about 572 nm.

13. A device, comprising:
a white light guide;
a first trans-reflective filter that receives light from the white light guide and is coupled to the white light guide, the first trans-reflective filter comprises a first plurality of film stacks that transmits a filtered polarized light within a first range of wavelengths, reflects light not within the first range of wavelengths, each film stack has a width and a pitch that restrict transmission of light parallel to the first plurality of film stacks, each film stack comprises:
  a first metal film disposed on a substrate having a first thickness;
  a first dielectric film disposed on the first metal film having a second thickness;
  a second metal film disposed on the first dielectric film having a third thickness; and
  a second dielectric film disposed on the second metal film having a fourth thickness;
a second trans-reflective filter that receives light from the white light guide and is coupled to the white light guide, the second trans-reflective filter comprises a second plurality of film stacks;
a third trans-reflective filter that receives light from the white light guide and is coupled to the white light guide, the third trans-reflective filter comprises a third plurality of film stacks;
a thin-film-transistor liquid-crystal display coupled to the first, second, and third trans-reflective filters; and
a polarizer coupled to the thin-film-transistor liquid-crystal display, wherein:
the width is about 40 nm and the pitch is about 115 nm;
the first metal film and the second metal film consist essentially of Ag;
the first thickness and third thickness are about 25 nm;
the first dielectric film and the second dielectric film consist essentially of TiO$_2$;
the second thickness is about 45 nm and the fourth thickness is about 60 nm;
the light parallel to the first plurality of film stacks corresponds to co-polarized light;
the first range of wavelengths is about 416 nm to about 524 nm; and
the filtered polarized light corresponds to a blue color of about 470 nm.

14. A first trans-reflective filter of a device having a plurality of trans-reflective filters, the first trans-reflective filter comprising:

a plurality of film stacks that transmits a first filtered light within a first range of wavelengths and reflects light not within the first range of wavelengths when light perpendicular to the plurality of film stacks is directed to the first trans-reflective filter of the device, and transmits a second filtered light within a second range of wavelengths when light parallel to the plurality of film stacks is directed to the first trans-reflective filter of the device, each film stack has a width and a pitch that allow transmission of the second filtered light within the second range of wavelengths when light parallel to the plurality of film stacks is directed to the first trans-reflective filter of the device, each film stack comprises:
- a first metal film disposed on a substrate having a first thickness, the first metal film comprising silver (Ag);
- a first dielectric film disposed on the first metal film having a second thickness, the first dielectric film comprising titanium oxide ($TiO_2$);
- a second metal film disposed on the first dielectric film having a third thickness, the second metal film comprising Ag; and
- a second dielectric film disposed on the second metal film having a fourth thickness, the second dielectric film comprising $TiO_2$.

15. The first trans-reflective filter of claim 14, wherein:
the width is about 50 nm and the pitch is about 100 nm;
the first thickness and third thickness are about 40 nm; and
the second thickness is about 90 nm and the fourth thickness is about 85 nm.

16. The first trans-reflective filter of claim 15, wherein:
the first range of wavelengths corresponds to a peak wavelength of about 644 nm with a full width at half maximum of about 105 nm;
the first filtered light corresponds to a red color and the light perpendicular to the plurality of film stacks corresponds to cross-polarized light;
the second range of wavelengths is about 400 nm to about 577 nm; and
the second filtered light corresponds to a cyan color and the light parallel to the plurality of film stacks corresponds to co-polarized light.

17. The first trans-reflective filter of claim 14, wherein:
the width is about 60 nm and the pitch is about 120 nm;
the first thickness and third thickness are about 25 nm; and
the second thickness is about 65 nm and the fourth thickness is about 90 nm.

18. The first trans-reflective filter of claim 17, wherein:
the first range of wavelengths corresponds to a peak wavelength of about 555 nm with a full width at half maximum of about 105 nm;
the first filtered light corresponds to a green color and the light perpendicular to the plurality of film stacks corresponds to cross-polarized light;
the second range of wavelengths is about 555 nm to about 682 nm; and
the second filtered light corresponds to a yellow color and the light parallel to the plurality of film stacks corresponds to co-polarized light.

19. The first trans-reflective filter of claim 14, wherein:
the width is about 70 nm and the pitch is about 140 nm;
the first thickness and third thickness are about 25 nm; and
the second thickness is about 40 nm and the fourth thickness is about 95 nm.

20. The first trans-reflective filter of claim 19, wherein:
the first range of wavelengths corresponds to a peak wavelength of about 460 nm with a full width at half maximum of about 105 nm;
the first filtered light corresponds to a blue color and the light perpendicular to the plurality of film stacks corresponds to cross-polarized light;
the second range of wavelengths comprises a range of about 400 nm to about 495 nm or 615 nm to about 700 nm; and
the second filtered light corresponds to a magenta color and the light parallel to the plurality of film stacks corresponds to co-polarized light.

\* \* \* \* \*